Patented Mar. 1, 1949

2,462,949

UNITED STATES PATENT OFFICE 2,462,949

METHOD OF TREATING SELENIUM

Floris de Boer, Eindhoven, Netherlands, assignor, by mesne assignments, to Hartford National Bank and Trust Company, Hartford, Conn., as trustee No Drawing. Application April 9, 1946, Serial No. 660,860. In the Netherlands May 24, 1944

Section 1, Public Law 690, August 8, 1946
Patent expires May 24, 1964

1 Claim. (Cl. 175—366)

For the increase of the conductivity of crystalline selenium intended for selenium cells U. S. Patent No. 2,162,613, issued June 13, 1939, to Hendrik Emmens and W. C. Van Geel suggested that the selenium should have added to it a halide adapted to be converted into a solid, stable, insoluble metal oxide by treatment with water or a substance having an alkaline reaction.

It has now been found possible to achieve particularly satisfactory conductivity by the addition of admixtures on the base of such metal halides, if selenium has added to it a mixture of one or more metal halides and selenium halides heated, to the exclusion of oxygen, to a high temperature, particularly a temperature exceeding 150° C.

The invention is important in connection with the manufacture of selenium cells, particularly selenium rectifiers. Selenium treated in accordance with the invention may have a blocking layer applied to it in the same manner as selenium treated with metal halide in accordance with U. S. Patent No. 2,162,613.

In order that the invention may be clearly understood and readily carried into effect it will now be described more fully with reference to the following example.

A mixture of 2 grams of zirconium tetrachloride ($ZrCl_4$) and 2 grams of selenium dichloride ($Se_2Cl_2$) is heated for 6 days at 200° C. to the exclusion of oxygen, for example in vacuo. If heating is effected at a higher temperature (from 250 to 300° C.) a shorter heating period suffices. If a small quantity of the dark coloured product obtained after cooling, is dissolved in fused, purified selenium and the selenium is then converted into the crystalline modification it is possible to obtain selenium that conducts the electric current considerably better than does a selenium which has only added to it zirconium tetrachloride.

Even better results are obtained by the addition of the residue that is left on subjecting the mixture of zirconium tetrachloride and selenium dichloride after the heating operation to a vacuum distillation in order to remove the most volatile constituents, particularly selenium dichloride and selenium tetrachloride. If fused pure selenium has dissolved in it a quantity of residue corresponding to from 0.01 to 0.04 percent by weight of zirconium calculated on the selenium the specific resistance of the selenium after conversion into the crystalline modification is but about 20 ohm cm.

What I claim is:

A method of preparing selenium for a blocking layer rectifier comprising the steps of mixing zirconium tetrachloride and selenium dichloride, heating said mixture at a temperature greater than about 200° C. in a vacuum, cooling the mixture, dissolving the cooled mixture in purified selenium, and converting the selenium to the crystalline modification.

FLORIS DE BOER.

REFERENCES CITED

The following references are of record in the file of this patent:

UNITED STATES PATENTS

| Number | Name | Date |
|---|---|---|
| 2,162,613 | Emmens | June 13, 1939 |
| 2,307,474 | Thompson | Jan. 5, 1943 |
| 2,316,905 | Waibel | Apr. 20, 1943 |